United States Patent [19]
McIntire et al.

[11] 3,785,456
[45] Jan. 15, 1974

[54] AUTOMATIC LUBRICATION SYSTEM

[75] Inventors: Nathan E. McIntire; Zelma M. Porter, both of Clarksville, Tenn.

[73] Assignee: Elk Craft, Inc., Clarksville, Tenn.

[22] Filed: Mar. 21, 1972

[21] Appl. No.: 236,756

[52] U.S. Cl............ 184/6 R, 184/15 R, 184/56 R
[51] Int. Cl............................................ F16n 7/30
[58] Field of Search............... 184/7 R, 7 D, 6.28, 184/56 R, 15 R, 15 B; 165/85; 222/22; 259/95, 96, 43, 44

[56] References Cited
UNITED STATES PATENTS

| | | | |
|---|---|---|---|
| 3,116,810 | 1/1964 | Olson | 184/15 B |
| 3,481,431 | 12/1969 | Dorsey | 184/7 D |
| 2,590,007 | 3/1952 | Griswold | 259/44 X |
| 3,595,341 | 7/1971 | Oglesbee | 184/6 R |
| 3,581,845 | 6/1971 | Van Nederynen | 184/7 D |

Primary Examiner—Manuel A. Antonakas
Attorney—Harvey B. Jacobson

[57] ABSTRACT

An automatic lubrication system for conveyors and the like, said system comprising means for initiating a lubrication cycle whereby a lubricant agitator and pump are sequentially actuated to deliver lubricant to a dispensing passageway, a timer and relay arrangement effective to open a lubrication solenoid valve to permit a quantity of lubricant to flow into the dispensing passageway and subsequently open a gas solenoid valve to blow gas through the passageway and expel substantially all of the lubricant therefrom onto the member being lubricated, in such a manner that dripping of the excess lubricant or clogging of the passageway is eliminated.

5 Claims, 8 Drawing Figures

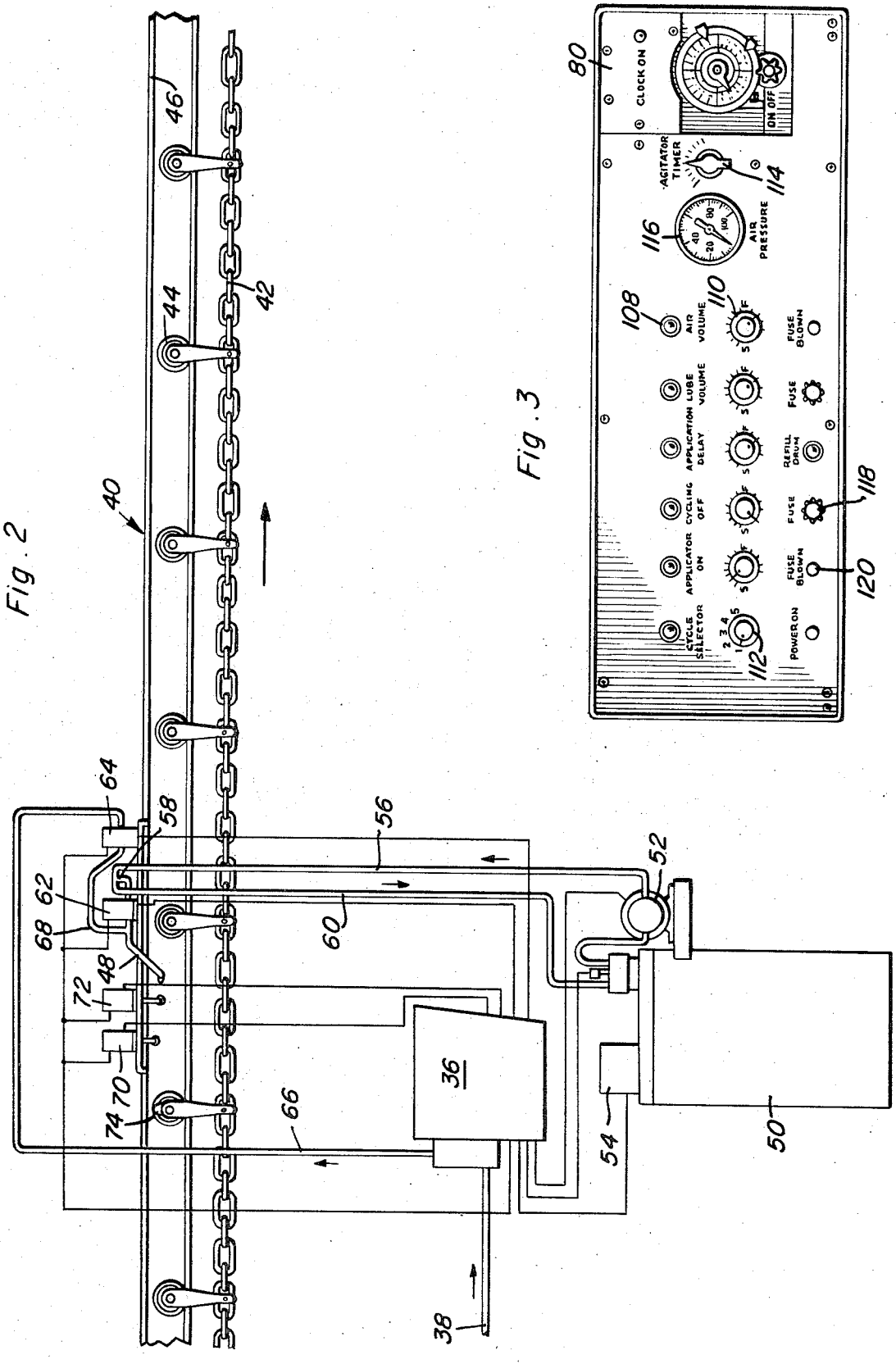

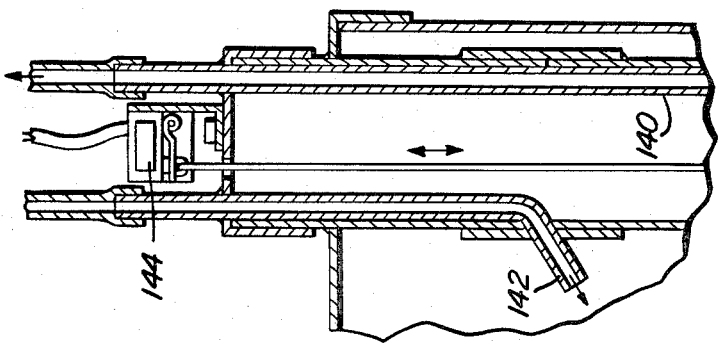
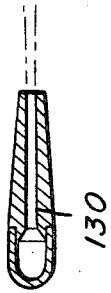
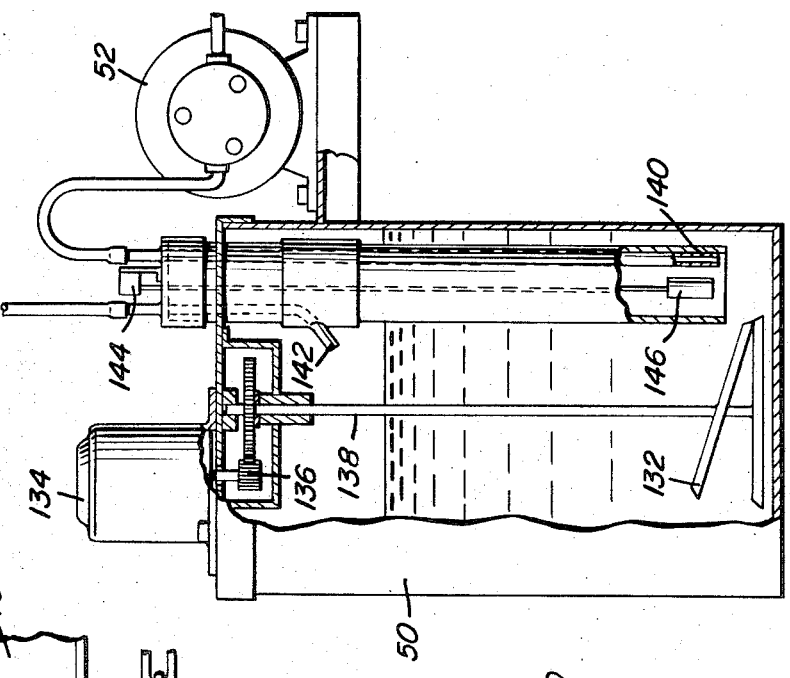
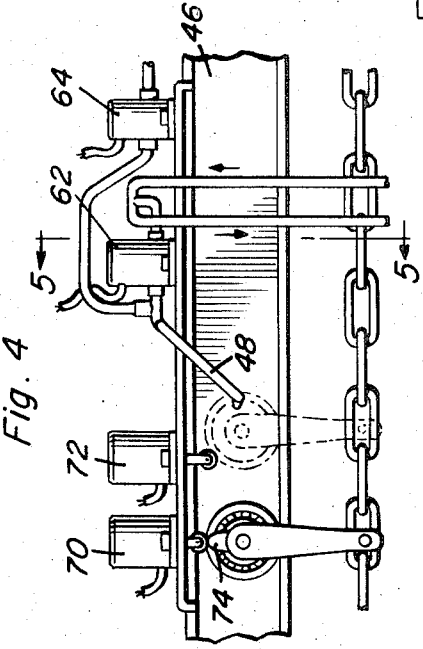
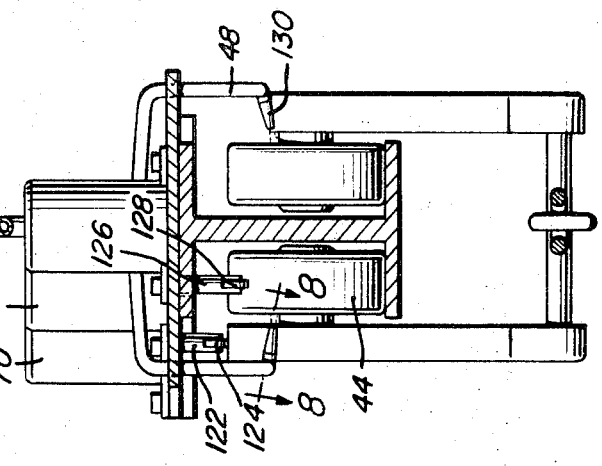

AUTOMATIC LUBRICATION SYSTEM

In the past, various conveyor lubrication systems have been proposed. More recently, the use of solid or semi-solid lubricants such as Molybdenum Disulfide has become common since such provides most desirable qualities for lubricating conveyor parts and the like. While such types of lubricants are highly desirable for these purposes, they require periodic stirring or agitation in order to prevent settling or separation of the lubricant particles from the surrounding liquid medium which facilitate easy movement and flow of the lubricant. In addition, if exposed to the atmosphere for extended periods of time, the liquid medium tends to dry up, whereby the lubricant assumes a solid or semisolid consistency which may easily clog small lubricant ports and passageways. Thus, conventional conveyor lubricating systems have proven unsuccessful for the handling of Molybdenum Disulfide or similar lubricants due to the agitation requirements and clogging problems. Furthermore, it is apparent that most conventional lubricating systems require periodic manual switching and are not truly automatic in nature.

Therefore, it is an object of the present invention to provide a novel conveyor lubricating system which may be operated without manual switching or attention and which includes means for effectively handling lubricants such as Molybdenum Disulfide without clogging passageways or the like.

Another object of the present invention is to provide a unique conveyor lubricating system which includes means for automatically dispensing a lubricant during preselected time intervals and in an efficient manner, whereby the conveyor members to be lubricated are synchronized with the lubricant dispensing device to assure proper lubrication of each member.

It is a further object of the present invention to provide a versatile automatic lubrication system including a lubricant dispensing tube which is automatically filled with a predetermined volume of lubricant which is subsequently expelled from the tube by a blast of gas, such that insufficient residue remains in the tube to permit dripping or clogging.

Still another object of the present invention is to provide a novel automatic lubrication system capable of dispensing both conventional petroleum lubricants, as well as Molybdenum Disulfide types, which is fully automatic, and which includes many standard commercially available components of proven reliability, whereby the overall system is durable, long lasting and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a side elevation of the lubricant system of the present invention mounted to a typical conveyor construction.

FIG. 3 is a front elevational view of the control panel associated with the present invention.

FIG. 4 is an enlarged elevational view of the sensors and solenoids associated with the present invention.

FIG. 5 is a sectional view taken along section 5—5 of FIG. 4.

FIG. 6 is an elevational view of the agitator associated with the present invention, with sections removed.

FIG. 7 is an enlarged sectional view of the float switch mechanism associated with the agitator shown in FIG. 6.

FIG. 8 is a sectional view of one of the lubricant dispensing nozzles associated with the present invention.

Figure 1:
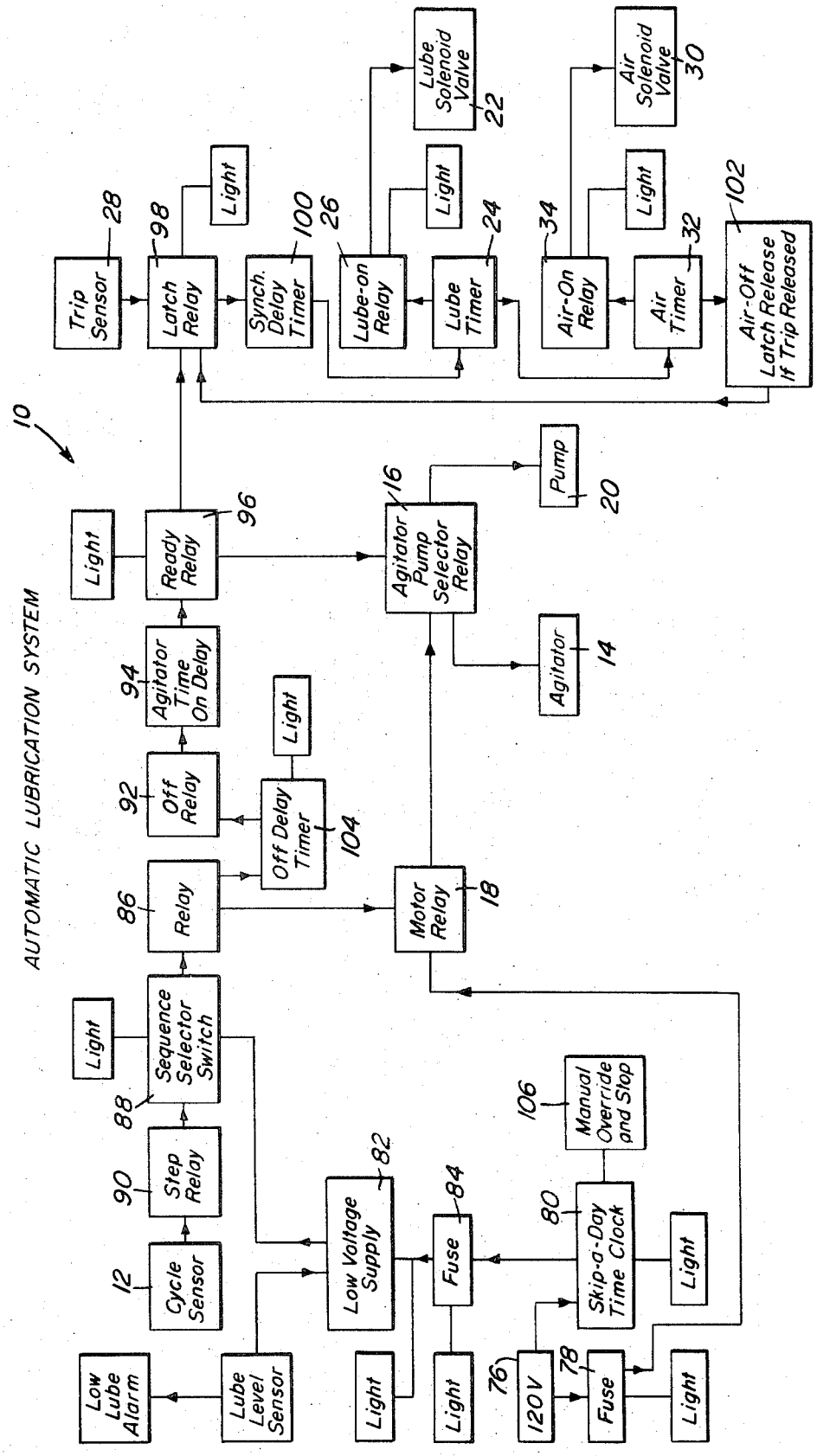
FIG. 1 is a simplified block diagram of the automatic lubrication system of the present invention.

Referring now, more particularly, to FIG. 1 of the drawings, a simplified block diagram of the automatic lubrication system of the present invention is generally indicated by the numeral 10 and includes a cycle sensor 12 which is tripped by an actuator attached to the conveyor as it passes a predetermined point along its path of travel. The cycle sensor is effective to energize an agitator 14 by way of an agitator pump selector relay 16, power being furnished through a conventional motor relay 18. The agitator is operated for a preselected time interval sufficient in length to agitate or stir the lubricant to assure proper mixing with its fluid medium. Subsequent to agitation, a lubricant pump 20 is energized and the lubricant dispensing system is conditioned to receive lubricant upon energization of a lubricant solenoid valve 22 through a timer 24 and relay 26. This operation is initiated by way of a trip sensor 28 which is actuated by each moving member to be lubricated as it advances past a predetermined point. Subsequent to operation of the lubricant solenoid valve, an air solenoid valve 30 is actuated to provide a gas blast which expels the lubricant from a lubrication tube onto the moving member to be lubricated. The gas blast operation is effected by way of a timer 32 and relay 34, which are actuated upon completion of the time interval of lubrication timer 24.

Referring briefly to FIG. 2, the structure of the lubrication system of the present invention is illustrated to include a control panel 36 provided with an incoming source of voltage, not illustrated, and an incoming gas line 38 connected to a conventional source of pressure, not shown. The control panel houses the timers, relays, and other electrical controls which perform the automatic functions of the lubrication system, as hereinafter explained. A typical overhead conveyor 40, of a conventional type is provided with an elongated chain 42 carried by a plurality of spaced roller bearings 44 which ride along an I-beam or rail 46 to advance loads or handle materials in a manner well known.

Since each roller bearing may be subjected to heavy load and long periods of operation, it is most often necessary to provide periodic lubrication to the moving parts of each roller bearing. This is achieved by way of a pair of lubricant dispensing tubes 48 which are mounted with their open ends positioned for periodic alignment with the roller bearings as they are advanced during use of the conveyor.

A source of lubricant, such as Molybdenum Disulfide, is provided in a container or reservoir 50 and delivered to dispensing tubes 48 by way of a conventional pump 52, subsequent to sufficient stirring or mixing by way of an agitator 54. After the lubricant has been properly agitated, the lubricant pump circulates the lubricant through a delivery line 56, past a T-connection 58 to a return line 60. The lubricant is normally prevented from flowing to the dispensing tube 48 by way of a lubricant solenoid valve 62 which is normally closed.

Electrical signals are provided from control panel 36 to effect opening of solenoid valve 62 for a time interval sufficient to at least partially fill the dispensing tube with lubricant. It should be noted that the time interval during which solenoid valve 62 is open is relatively short in duration, such that the passage of lubricant through the exhaust ends of the dispensing tubes is prevented. After the delivery tubes have been filled with lubricant, a second signal is provided from control panel 36 which is effective to open a gas solenoid valve 64, thereby permitting the flow of air, or other gas from inlet line 38 through line 66 and line 68 to the dispensing tubes in order to force or expel substantially all of the lubricant previously pumped into the dispensing tubes. This gas blast operation is synchronized with the position of each conveyor roller to assure that the lubricant is expelled at the proper location on each roller member.

The lubrication system is further provided with a pair of sensors 70 and 72, corresponding to blocks 12 and 28 respectively in FIG. 1, which furnish signals to the control panel which are indicative of the positions of the moving members to be lubricated. At least one of the moving members associated with the continuous conveyor is provided with a tab or trip element 74 which extends in a direction which is effective to actuate cycle sensor 70. Preferably, the continuous conveyor is provided with a single trip element, such that the cycle sensor is acutated upon each complete revolution of the conveyor. Of course, if desired, more than one trip element may be utilized when found to be advantageous to the lubrication system operation.

Trip sensor 72 is positioned in such a manner that it is not actuated by the passage of trip element 74, but is actuated by the passage of each roller bearing. The trip sensor provides signals to the control panel which initiate preselected time intervals to assure proper synchronization for dispensing of the lubricant. Preferably, sensors 70 and 72 are comprised of conventional limit switch construction which are mechanically actuated by the trip element 74 and roller bearings 44, respectively. However, the use of other sensing devices, such as proximity limit switches, or electric eye systems, may be utilized with the system of the present invention, if desired.

Referring again to FIG. 1 of the drawings, the operation of the circuitry associated with the present invention will be more fully explained. The system is fed by an incoming source of voltage 76, preferably 120 VAC, which is fed to motor relay 18 by way of a fuse 78. Voltage is also fed to a master timer 80, such as a skip-a-day time clock of a conventional type which may be adjusted to enable and disenable the lubrication system in accordance with the anticipated work schedule and use of the associated conveyor being lubricated. With the master timer in the ON condition, voltage is furnished to a low voltage supply 82 by way of a fuse 84. A reduced control voltage is normally fed to a relay 86 provided with a pair of normally open contacts connected to motor relay 18.

The lubrication cycle is initiated by a signal from cycle sensor 12 to a sequence selector switch 88 by way of a step relay 90. The step relay and sequence selector switch are conventional types which may be arranged to provide an output signal upon completion of a preselected number of input pulses from a signal source, such as the cycle sensor 12. Thus, the system may be set up to dispense lubricants every other time the cycle sensor is actuated or every third time and so on, depending upon the lubricant requirements.

Assuming that the cycle sensor has been actuated to initiate a lubrication cycle, the output signal from sequence selector switch 88 is effective to energize relay 86 which, in turn, effects closure of motor relay 18 to provide primary voltage to the agitator pump selector relay 16. At the same time, an off relay 92 is actuated to initiate operation of an agitator timer 94 for a preselected ON time delay. Thus, agitator 14 is energized and continues to operate until agitator timer 94 completes its time interval, upon which a ready relay 96 is actuated which, in turn, conditions selector relay 16 to deenergize agitator 14 and energize pump 20.

Actuation of the ready relay 96 is also effective to condition the lubrication dispensing portion of the system to receive lubricant from the reservoir illustrated in FIG. 2 and to dispense such in accordance with the above description. When trip sensor 28 is actuated by a moving member of the conveyor, the input signal from ready relay 96 passes through a latch relay 98 to a synchronizing delay timer 100. This timer is a conventional type interval timer with relatively fine adjustment to assure proper synchronization between the positions of the moving members and the lubrication operation.

Upon completion of the synchronization time delay interval, a signal is fed to lubrication timer 24 which, in turn, actuates lubrication relay 26 to open the lubrication solenoid valve 22. The lubrication solenoid valve remains open for a time interval which is preselected to at least partially fill the lubricant dispensing tube, as explained above. Upon completion of the time interval of lubrication timer 24, a signal is fed to air timer 32 which, in turn, actuates relay 34 to effect opening of the air solenoid valve 30. At this point in the system's operation, a blast of air or other gas passes through the lubricant dispensing tubes to expel substantially all of the lubricant previously deposited therein.

Upon completion of the gas blast operation, an output signal from air timer 32 is fed to a latch release mechanism 102 which is effective to release relay 98, unless the trip sensor 28 is being actuated at the same time, in which case the system would continue to function. Assuming that trip sensor 28 is not being actuated at the same instant as the latch release signal is fed to relay 98, the latch relay is deactuated, thereby conditioning the lube dispensing portion of the system for a repeat operation.

After each of the moving members has been lubricated in accordance with the above description, subsequent actuation of the cycle sensor 12 is effective to actuate the step relay 90 and sequence selector switch 88 to deactuate relay 86. Opening of relay 86 provides a signal to an off delay timer 104 which delays deactuation of the off relay 92, such that the system continues to function for a preselected time delay interval to assure that the remaining unlubricated moving members are lubricated before the system is shut down. Normally this off delay is required since several of the moving members adjacent to trip element 74 were not originally lubricated due to the fact that the agitator was stirring the lubricant prior to the pumping of such to the lubricant dispensing portion of the system.

From the foregoing description it will be appreciated that the lubrication system of the present invention is totally automatic in nature and does not require manual resetting or adjustment subsequent to the initial setup of the timers and sequence selector switch. If desired, however, the system may be operated or stopped by way of manual controls 106 associated with the master timer 80.

Referring to FIG. 3, the scheme of controls associated with control panel 36 may be seen to include a plurality of indicating lights 108 indicative of the conditions of the electrical system associated with the present invention. In addition, a plurality of time interval adjustment knobs 110 associated with the above-mentioned timers are provided for the convenient adjustment of each time interval. A sequence selector switch knob 112 is provided to select the desired mode of operation, whereby the number of cycle sensor operations to recycle the system may be preset. The master timer 80 is mounted at the right hand side of the control panel adjacent to an agitator timer adjustment knob 114 and a gas pressure indicator 116 associated with the gas blast portion of the system. In addition, the control panel is provided with readily replaceable fuses at 118 and associated indicating lights 120.

With reference to FIGS. 4 and 5 of the drawings, the structural arrangement of the solenoids and sensors may be seen in more detail. It will be appreciated that cycle sensor 70 is transversely offset from trip sensor 72, such that operation of one is independent of the other. Cycle sensor 70 is provided with an actuation member 122 which extends downwardly into the path of travel of the trip element 74, such that the actuator is reciprocated in an upward direction as a roller 124 associated therewith makes contact with the trip element. This operation provides the above described pulse to the step relay.

Similarly, trip sensor 72 is provided with an actuator 126 and roller 128 which are transversely spaced from those of the cycle sensor and are positioned within the path of travel of the roller bearings 44. As the conveyor is advanced, the roller bearings reciprocate actuator 126 in a vertical direction, thereby effecting operation of the trip sensor to provide a signal to latch relay 98 which, in turn, is effective to initiate a lubrication dispensing operation.

Solenoid valves 62 and 64 are, preferably, mounted on top of the conveyor I-beam 46 in close proximity to the fluid dispensing tubes. The opened ends of the dispensing tubes are provided with nozzle members 130 which are of such a configuration to provide the desired spray pattern. FIG. 8 illustrates a typical nozzle member which is shaped to provide a relatively narrow spray which may be concentrated upon the moving members to be lubricated. It should be noted, however, that nozzle members other than that illustrated or additional solenoid valves may be utilized, if desired.

FIGS. 6 and 7 illustrate the structural arrangement of the agitator assembly associated with the present invention. The reservoir or container 50 of desired capacity, is provided with a paddle member 132 which is rotated by an agitation motor 134 through a drive train 136 and output shaft 138. In addition, after proper agitation of the lubricant has been completed, pump 52 draws the lubricant through an outlet tube 140 for delivery of the lubricant to the dispensing portion of the system, as explained above. The lubricant may be returned to the reservoir by way of a return inlet 142 preferably located above the normal level of the lubricant.

The agitator assembly is also provided with a float responsive switch 144 connected to a buoyant member 146, such that the switch is actuated when the lubricant reaches a predetermined low level, whereby an indicating light is energized on the control panel. In addition, the lubricant level sensor is connected to the low voltage supply 82, as shown in FIG. 1, and is effective to disconnect supply 82 from sequence selector switch 88 when the low lubricant level is reached to automatically shut down the system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. In combination: an automatic lubrication system and a conveyor having moving members requiring lubrication, said system comprising: a lubricant dispensing tube with a lubricant receiving end and an opened end adapted to permit the exhaust of lubricant therethrough to a moving member to be lubricated, electrical means including means for sensing the passage of the moving members past a predetermined point along the conveyor's path of travel, a source of lubricant under pressure, lubricant valve means opened in response to signals from said sensing means for communicating said source of lubricant with the lubricant receiving end of said dispensing tube for a preselected time interval to at least partially fill said dispensing tube with lubricant, a source of gas pressure, and gas valve means opened in response to signals from said electrical means subsequent to filling of said dispensing tube with lubricant for communicating said gas pressure source with said dispensing tube at a point remote from said open end to blow the lubricant therefrom through said opened end, said electrical means including lubricant timer means responsive to said sensing means to open said lubricant means for a preselected time interval corresponding to a predetermined volume of lubricant permitted to flow into said dispensing tube, gas timer means for initiating a gas time interval in response to the completion of said lubricant time interval to open said gas valve means to blow the lubricant from said dispensing tube, relay means responsive to the completion of said gas time interval to condition said lubricating system to reset said timer means for repeat of the lubricating and gas blast operations, and delay timer means responsive to said sensing means upon actuation thereof by the passage of a moving member to be lubricated to initiate a preselected time delay interval and subsequently effect actuation of said lubricant timer means to initiate said lubricant time interval, said time delay interval being effective to synchronize the position of each moving member with said gas time interval such that the moving member being lubricated is properly positioned relative to the opened end of said dispensing tube.

2. A lubricant system for handling a solid lubricant in a fluid medium, said lubricant system comprising: an open ended lubricant dispensing member, a reservoir of solid lubricant in a fluid medium, passageway means defining a delivery path from said reservoir and a return path to said reservoir, said return path being in direct communication with said delivery path, pump means associated with said passageway means for continuously circulating said lubricant and associated fluid medium through said passageway means, and selectively operable valve means connected to said passageway means at the junction of said delivery path and said return path and operable in an open position to permit a quantity of said lubricant and fluid medium to flow from said delivery path to said dispensing member, continuous circulation of said lubricant and fluid medium by said pump means preventing clogging of said passageway means while said valve means is closed.

3. The system set forth in claim 2 including gas blast means connected to said dispensing member at a point remote from the open end thereof to selectively blow the lubricant and associated fluid medium therefrom.

4. In combination with equipment lubricated with a lubricant having a fluency property that deteriorates under static conditions, a lubricating system comprising a reservoir containing said lubricant, conduit means connected to the reservoir for conducting the lubricant in a closed circuit, circulating pump means connected to the conduit means for inducing flow of the lubricant through said circuit to maintain the lubricant in a state of motion and thereby sustain said fluency property, dispensing means for discharging said lubricant into said equipment, and valve means connecting the conduit means to the dispensing means for intermittently supplying the lubricant to the dispensing means only while in said state of motion.

5. The combination of claim 4 including control means for programming operation of the pump means and the valve means to open the valve means only while the lubricant is under a dynamic pressure head induced by the pump means prior to opening of the valve means.

* * * * *